US007328095B2

(12) United States Patent
Imamura et al.

(10) Patent No.: US 7,328,095 B2
(45) Date of Patent: Feb. 5, 2008

(54) LOCK-UP CONTROL FOR TORQUE CONVERTER

(75) Inventors: Tatsuya Imamura, Fuji (JP); Hiroshi Sekiya, Fuji (JP); Toshiji Iida, Fuji (JP); Koji Dohi, Fuji (JP)

(73) Assignee: Jatco Ltd, Shizuoka (JP)

( * ) Notice: Subject to any disclaimer, the term of this patent is extended or adjusted under 35 U.S.C. 154(b) by 325 days.

(21) Appl. No.: 11/088,243

(22) Filed: Mar. 24, 2005

(65) Prior Publication Data

US 2005/0222737 A1    Oct. 6, 2005

(30) Foreign Application Priority Data

Mar. 31, 2004    (JP)    .............................. 2004-106539

(51) Int. Cl.
*G06F 7/00*    (2006.01)

(52) U.S. Cl. .......................................... 701/67; 701/68

(58) Field of Classification Search ............ 701/67–68; 192/65, 231, 233, 308, 314, 320; 477/70, 477/77, 80, 84

See application file for complete search history.

(56) References Cited

U.S. PATENT DOCUMENTS

| 5,332,073 | A | 7/1994 | Iizuka |
| 5,752,895 | A | 5/1998 | Sugiyama et al. |

FOREIGN PATENT DOCUMENTS

| JP | 03-282053 | 12/1991 |
| JP | 2002-205576 A | 7/2002 |

*Primary Examiner*—Yonel Beaulieu
(74) *Attorney, Agent, or Firm*—Foley & Lardner LLP

(57) ABSTRACT

A lock-up clutch control device controls a lock-up clutch provided in a torque converter in a vehicle. The lock-up clutch control device includes a sensor for detecting a rise of a vehicle speed; a differential pressure generator which generates a differential pressure to lock the lock-up clutch; and a controller. The controller is programmed to command the differential pressure generator to lock the lock-up clutch when the vehicle speed exceeds a predetermined low vehicle speed, after the vehicle is started; subsequently monitor the rise of the vehicle speed; and command the differential pressure generator to unlock the lock-up clutch when the monitored rise of the vehicle speed is lower than a preset value.

10 Claims, 6 Drawing Sheets

| Cnt | 1 | 2 | 3 | ......... | 20 |
|---|---|---|---|---|---|
| Vss | Vss(1) | Vss(2) | Vss(3) | ......... | Vss(20) |

*FIG. 4*

LOCK-UP CONTROL FOR TORQUE CONVERTER

FIELD OF THE INVENTION

This invention relates to a control device for controlling lock-up of a torque converter.

BACKGROUND OF THE INVENTION

In a torque converter comprising a lock-up clutch, control of a differential pressure at the front and rear of the lock-up clutch (lock-up differential pressure) locks/disengages the lock-up clutch. The lock-up differential pressure is gradually raised from a predetermined initial differential pressure in order to shift the torque converter from a converter state to a lock-up state. The torque converter is shifted from the converter state to the lock-up state through a slip state. The lock-up clutch is released or disengaged in the converter state, slips in the slip state, and is locked in the lock-up state.

Japanese Patent Application Laid-Open No. 2002-205576 published by the Japanese Patent Office in 2002 discloses control of a lock-up clutch which improves fuel economy by performing locking up from a low vehicle speed. According to the abovementioned conventional technology, when the vehicle speed does not increase on an ascending slope or the like, a transmission ratio or gear ratio of the automatic transmission is changed to Low, while maintaining the lock-up state to amplify the transmission torque of the automatic transmission.

SUMMARY OF THE INVENTION

However, when there is not enough torque at a time of starting the vehicle on an ascending slope, the vehicle is started at a transmission ratio (or gear ratio) on the lowest gear side, thus the transmission ratio cannot be changed to a lower gear side. In this case, starting locking up at a low vehicle speed, the vehicle speed does not increase, and moreover a muffled sound or a noise occurs.

An object of this invention is to secure an increase of the vehicle speed when the torque converter is locked up from a low vehicle speed, and to prevent the occurrence of a muffled sound and noise.

In order to achieve the above object, this invention provides a lock-up clutch control device which controls a lock-up clutch provided in a torque converter which is mounted between the engine and transmission provided in a vehicle. The lock-up clutch control device switches the state of the torque converter between a converter state and a lock-up state by controlling a differential pressure supplied to the lock-up clutch. The lock-up clutch control device comprises a sensor for detecting a rise of a vehicle speed; a differential pressure generator which generates the differential pressure supplied to the lock-up clutch; and a controller. The controller is programmed to command the differential pressure generator to lock the lock-up clutch when the vehicle speed exceeds a predetermined low vehicle speed, after the vehicle is started; subsequently monitor the rise of the vehicle speed; and command the differential pressure generator to unlock the lock-up clutch when the monitored rise of the vehicle speed is lower than a preset value.

The details as well as other features and advantages of this invention are set forth in the remainder of the specification and are shown in the accompanying drawings.

BRIEF DESCRIPTION OF THE DRAWINGS

FIG. 3A is a graph showing a time variation of the vehicle speed VSP. FIG. 3B is a graph showing a time variation of a differential pressure command value. FIG. 3C is a graph showing a time variation of a smooth lock-up flag Flu. FIG. 3D is a graph showing a time variation of an insufficient acceleration flag Fα.

FIG. 4 is a table which sets a vehicle speed threshold value Vss corresponding to a value of a counter Cnt.

FIG. 5A is graph showing a time variation of the vehicle speed VSP. FIG. 5B is a graph showing a time variation of a differential pressure command value. FIG. 5C is a graph showing a time variation of an acceleration of the vehicle. FIG. 5D is a graph showing a time variation of the insufficient acceleration flag Fα.

DESCRIPTION OF THE PREFERRED EMBODIMENTS

Figure 1:
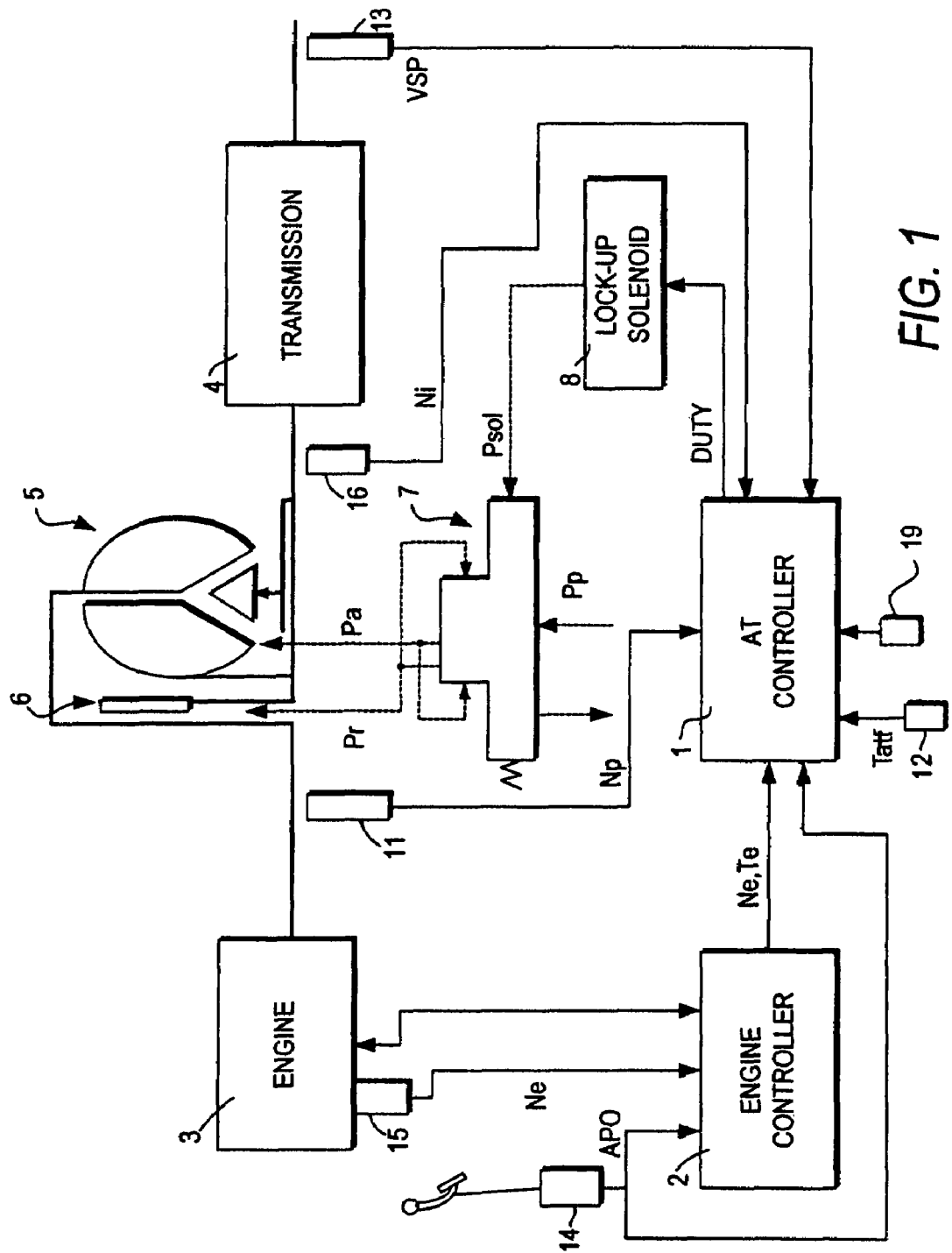
FIG. 1 is a schematic view of a vehicle in which is mounted an automatic transmission according to the embodiments.

FIG. 1 shows a vehicle in which is mounted an automatic transmission according to this embodiment. An engine 3 is coupled to an automatic transmission comprising a transmission 4 and a torque converter 5. The transmission 4 may comprise one or more planetary gear sets, or a continuously variable transmission (CVT). The torque converter 5 comprises a lock-up clutch 6. The lock-up clutch 6 is selectively brought to a lock-up state (engaged state) or an unlock-up state (disengaged state) in accordance with the operational status of the vehicle.

The torque converter 5 has incorporated therein the lock-up clutch 6 which is rotated along with a torque converter output element (turbine). When the lock-up clutch 6 is locked to a torque converter input element (impeller), the torque converter 5 is brought to the lock-up state where the input and output elements are directly coupled to each other.

The lock-up clutch 6 is operated in accordance with a differential pressure Pa−Pr between a torque converter apply pressure Pa and a torque converter release pressure Pr at the both sides (the front and rear) of the lock-up clutch 6. When the release pressure Pr is higher than the apply pressure Pa, the lock-up clutch 6 is disengaged, thus direct coupling is not made between the torque converter input and output elements. When the release pressure Pr is lower than the apply pressure Pa, the lock-up clutch 6 is locked, and direct coupling is made between the torque converter input and output elements.

When locking the lock-up clutch 6, a locking force, i.e. a lock-up capacity, of the lock-up clutch 6 is determined by the differential pressure Pa−Pr. The larger the differential pressure, the more the locking force of the lock-up clutch 6 increases, thereby increasing the lock-up capacity.

The differential pressure Pa−Pr is controlled by a lock-up control valve 7 which is generally known. The lock-up control valve 7 is, for example, disclosed in U.S. Pat. No. 5,332,073 granted by Iizuka on Jul. 26, 1994, or U.S. Pat. No. 5,752,895 granted by Sugiyama et al. on May 19, 1998.

According to this embodiment, a lock-up solenoid valve 8 uses a pump pressure Pp as the original pressure to create a line pressure Psol applied to the lock-up control valve 7 in response to a duty signal DUTY In the lock-up control valve 7, the apply pressure Pa and the release pressure Pr act to oppose each other. Further, a biasing force of a spring is added in the same direction as the apply pressure Pa, a biasing force of a spring is added in the same direction as the release pressure Pr, and at the same time the line pressure Psol is applied in the same direction as the release pressure Pr. The lock-up control valve 7 determines the differential pressure Pa–Pr such that these oil pressures and the biasing forces of the springs are balanced. The lock-up solenoid valve 8 and the lock-up control valve 7 constitute a differential pressure generator which generates differential pressure added to the lock-up clutch.

An AT (automatic transmission) controller 1 constituted by a microcomputer and the like determines the duty signal DUTY in accordance with an operational status of the vehicle, and controls the differential pressure Pa–Pr by means of the lock-up solenoid valve 8. The AT controller 1 comprises a microcomputer having a central processing unit (CPU), a random access memory (RAM), a read-only memory (ROM), an input/output (I/O) interface, and a timer. Read-only memory (ROM) may be a programmable ROM.

The AT controller 1 receives signals that indicate a running state of the vehicle and an operational state of the driver. For example, these signals are signals that indicate an input shaft rotational speed Ni of the transmission 4, which is detected by an input shaft rotation sensor 16, a pump impeller rotational speed Np detected by an impeller rotation sensor 11, an accelerator pedal stroke APO (or an opening of a throttle valve TVO) detected by an accelerator pedal stroke sensor 14, an oil temperature Tatf detected by an oil temperature sensor 12, and the vehicle speed VSP detected by a vehicle speed sensor 13. The input shaft of the transmission 4 corresponds to an output shaft of the torque converter 5, and the rotational speed of the input shaft of the transmission 4 is equivalent to the rotational speed of the output shaft of the torque converter 5. The pump impeller rotational speed Np is equivalent to an input rotational speed (=engine speed Ne) inputted to the torque converter 5. Further, the AT controller 1 receives signals indicative of the engine speed Ne and engine torque Te from an engine controller 2. The AT controller 1 controls locking, release, or slippage of the lock-up clutch 6 by means of these signals. The engine speed Ne is detected by an engine speed sensor 15 and is input to the engine controller 2.

The engine controller 2 comprises a microcomputer having a central processing unit (CPU), a random access memory (RAM), a read-only memory (ROM), and an input/output (I/O) interface. The engine controller 2 and the AT controller 1 may be integrated to be a single controller.

The AT controller 1 performs smooth lock-up in accordance with an operational status of the vehicle. Smooth lock-up means locking the lock-up clutch 6 from the converter state through the slip state, and it is performed, for example when variation in the accelerator pedal stroke APO is small and when the vehicle speed VSP is raised gradually.

According to this embodiment, locking up is performed from a low vehicle speed after starting the vehicle. For example, in order to complete locking up at Vehicle Speed VSP=25 Km/h, smooth lock-up is started at Vehicle Speed VSP=approx. 10 Km/h immediately after starting the vehicle. During the period of smooth lock-up immediately after starting the vehicle, an increase of the vehicle speed VSP is secured preferentially, whereby degradation of running performance and the occurrence of a muffled sound and noise are prevented.

Figure 2:
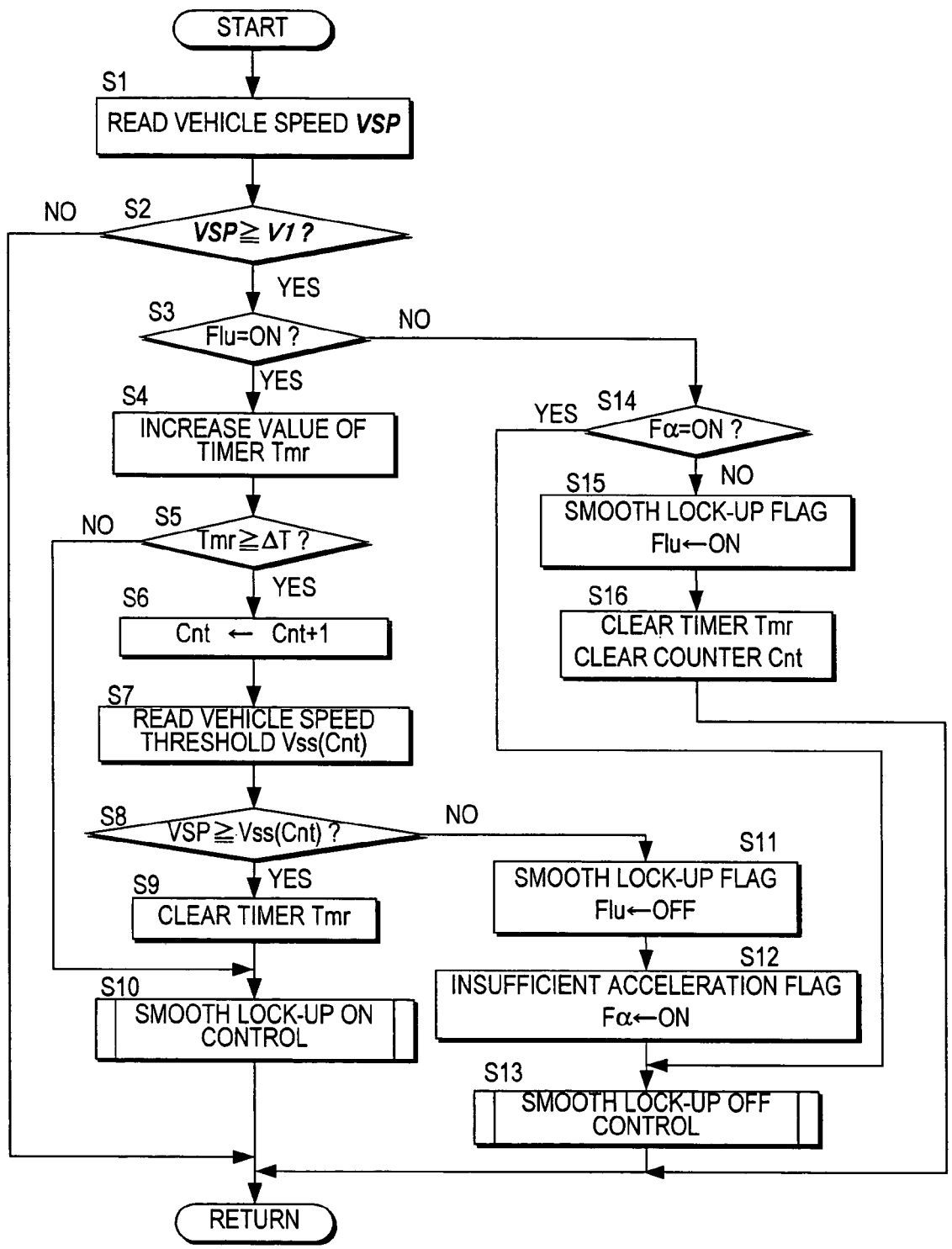
FIG. 2 is a flow chart showing a control routine conducted by an AT controller according to a first embodiment.

A flow chart of FIG. 2 shows an example of a control routine which relates to the smooth lock-up control performed immediately after starting the vehicle, the control being performed by the AT controller 1. The control routine is repeatedly executed at a predetermined cycle (for example, several dozen msec), until the lock-up is completed or until the smooth lock-up is released.

In Step S1, an actual vehicle speed VSP is read.

In Step S2, it is judged whether or not the vehicle speed VSP is larger than or equal to a predetermined vehicle speed V1 for starting the smooth lock-up. In other words, it is judged whether or not the starting conditions of the smooth lock-up control holds. If the vehicle speed VSP is larger than or equal to the predetermined vehicle speed V1 (for example, 10 km/hr) (i.e. if VSP≧V1), the routine proceeds to Step S3. However, if. the vehicle speed VSP is smaller than the predetermined vehicle speed V1 (i.e. if VSP<V1), the routine ends. Note that as the starting conditions of the smooth lock-up control, a condition for an accelerator pedal stroke APO may be added to the condition for the vehicle speed VSP.

In Step S3, it is judged whether a smooth lock-up flag Flu indicating that smooth lock-up control is enabled or being performed is ON or not. When the flag Flu is not ON (Flu=0), the routine proceeds to Step S14 in order to enable a start of the smooth lock-up. In Step S14, it is judged whether an insufficient acceleration flag Fα indicating that the acceleration of the vehicle is insufficient is ON or not. If the insufficient acceleration flag Fα is not ON, (Fα=0), the routine proceeds to Step S15. In Step S15, the smooth lock-up flag Flu is set to ON (Flu=1). Next, a timer for monitoring time Tmr and a counter Cnt are cleared in Step S16. Consequently, the smooth lock-up control is executed from execution of the next control routine. If the insufficient acceleration flag Fα is ON (Fα=1), the routine proceeds to a smooth lock-up OFF control of Step 513, which is described hereinbelow.

On the other hand, when the smooth lock-up flag Flu is ON (Flu=1) in Step S3, the routine proceeds to Step S4. In Step S4 a value of the timer for monitoring time Tmr is increased by a predetermined value. Next, it is judged in Step S5 whether the value of the time Tmr has reached a predetermined period of time ΔT (e.g. 1 second) or not.

Figure 4:
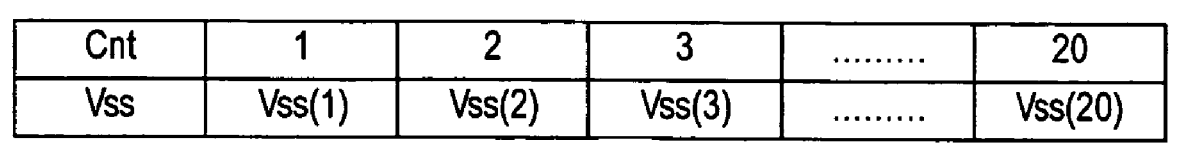

If the value of the timer Tmr is less than the predetermined period of time ΔT, the routine proceeds to Step S10. A smooth lock-up ON control for smoothly locking the lock-up clutch 6 is performed in Step On the other hand, if the timer Tmr is at least the predetermined period of time ΔT, the routine proceeds to Step S6, and there a value of the counter Cnt is increased by one. Next, the routine proceeds to Step S7, and there a vehicle speed threshold Vss corresponding to the value of the counter Cnt is searched from a look-up-table which is set in advance and stored in the memory of the AT controller 1 and is shown in FIG. 4. The look-up-table in FIG. 4 sets the vehicle speed threshold Vss (Cnt) for each value of the counter Cnt in order to monitor the increase of the vehicle speed VSP for every predetermined period of time ΔT. The increase of the vehicle speed VSP is monitored after the vehicle speed VSP exceeds the predetermined vehicle speed V1 after starting the vehicle. Therefore, in accordance with the time elapsed since the smooth lock-up ON control has been started, the vehicle speed threshold Vss (Cnt) is set. The vehicle speed threshold Vss (Cnt) represents a vehicle speed which can be reached sufficiently as long as the vehicle is started normally. The vehicle speed threshold Vss (Cnt) is increased in accordance with the value of the counter Cnt. The value of the counter Cnt indicates the time elapsed since the smooth lock-up ON control has been started or the time elapsed since the smooth lock-up flag Flu is set to ON. If the predetermined period of time $\Delta T$ is 1 second, Vss (1), Vss (2), Vss (3), Vss (4), Vss (5) may be 11 km/hr, 12 km/hr, 13 km/hr, 14 km/hr, 15 km/hr, respectively.

Next, in Step S8, the vehicle speed threshold Vss searched in Step S7 is compared to a current vehicle speed VSP. If the current vehicle speed VSP is larger than the vehicle speed threshold Vss (Cnt), it is judged that the increase of the vehicle speed VSP is normal, and the routine proceeds to Step S9. There, the timer Tmr is cleared in preparation for executing the next control routine, and this next control routine will count the timer Tmr from zero. Thereafter the routine proceeds to Step S10, and there the lock-up differential pressure corresponding to an operational status of the vehicle is determined to implement locking control of the lock-up clutch.

On the other hand, in Step S8, if the current vehicle speed VSP is less than the vehicle speed threshold Vss (Cnt), it is judged that the increase of the vehicle speed is insufficient, and the routine proceeds to Step S11. In Step S11, the smooth lock-up flag Flu is set to OFF (Flu=0). Next, in Step S12, the insufficient acceleration flag F$\alpha$ is set to ON (F$\alpha$=1). Then, smooth lock-up OFF control is started in Step S13. Note that the smooth lock-up OFF control is to gradually disengage the lock-up clutch 6 which is in a middle of being locked or in a locked state, and the control is finished when the lock-up clutch 6 is completely released or unlocked. Moreover, the insufficient acceleration flag F$\alpha$ is reset when the vehicle is stopped (F$\alpha$=0).

According to the control as above, when the increase of the vehicle speed VSP is below the preset value (Vss(Cnt)) after starting the vehicle to begin the smooth lock-up ON control, the smooth lock-up ON control is discontinued, and the smooth lock-up OFF control is started. Thereby, the lock-up clutch 6 in the middle of being locked is disengaged and the torque converter is shifted to a converter state, thus the input torque to the transmission 4 is increased, and the vehicle speed VSP can be raised. Specifically, when there is not enough torque which is necessary to sufficiently raise the vehicle speed VSP, locking up at a low speed is avoided, and the increase of the vehicle speed VSP is secured. For this reason, the running performance and mobility performance can be secured without the occurrence of a muffled sound.

The time charts of FIGS. 3A to 3D respectively indicate the vehicle speed VSP, a differential pressure command value for the lock-up solenoid valve 8 and the smooth lock-up flag Flu, and the insufficient acceleration flag F$\alpha$ that are obtained by the abovementioned control.

The smooth lock-up flag Flu is ON at a time T0 at which the vehicle speed VSP reaches the predetermined vehicle speed V1 after the vehicle is started, which is the starting condition for the smooth lock-up ON control. Along with this, the differential pressure command value is also raised in a predetermined pattern, and locking of the lock-up clutch 6 is started.

After starting of the smooth lock-up ON control, the counter Cnt is incremented for every predetermined period of time $\Delta T$. The vehicle speed threshold Vss (Cnt) corresponding to the value of the counter Cnt is compared to the current vehicle speed VSP, and the smooth lock-up ON control is continued as long as the actual vehicle speed VSP exceeds the vehicle speed threshold Vss (Cnt). When the vehicle speed VSP is raised steadily, the vehicle speed VSP and the differential pressure command value are raised as shown by the broken lines in FIGS. 3A and 3B, and the smooth lock-up is completed. Locking up is started when the predetermined low vehicle speed V1 is exceeded immediately after the vehicle is started. When the vehicle speed is raised so as to exceed the preset value (Vss (Cnt)), it is possible to improve fuel economy by performing locking up from the low vehicle speed.

Figure 3A:
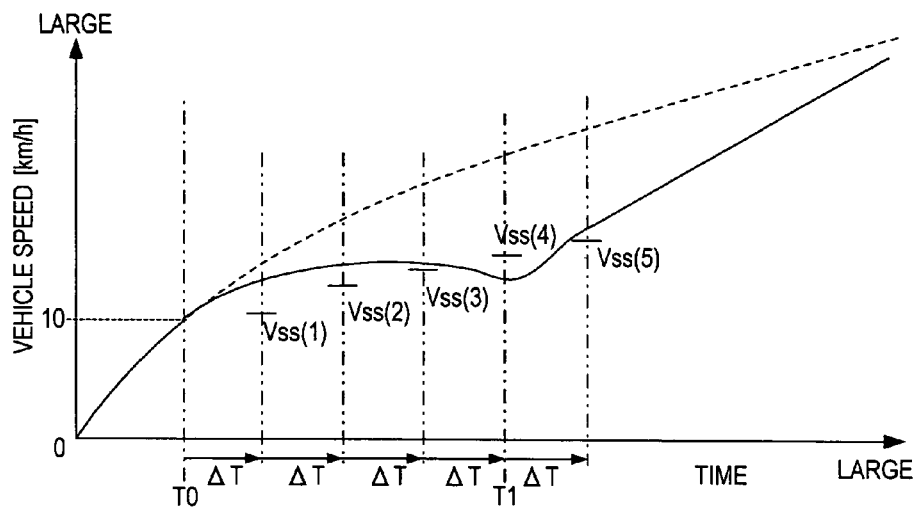
FIGS. 3A-3D are schematic views showing how control in the first embodiment is performed.
Figure 3B:
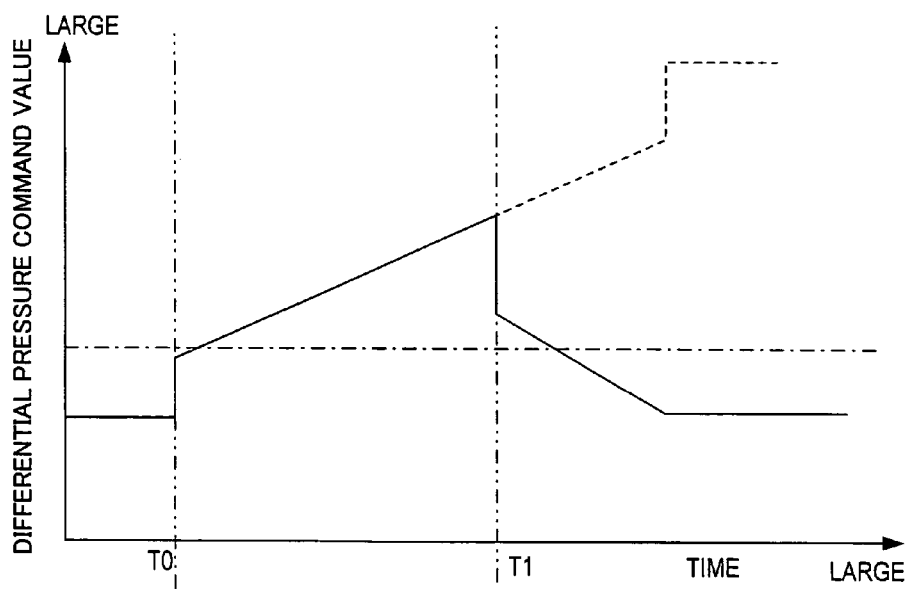
Figure 3C:
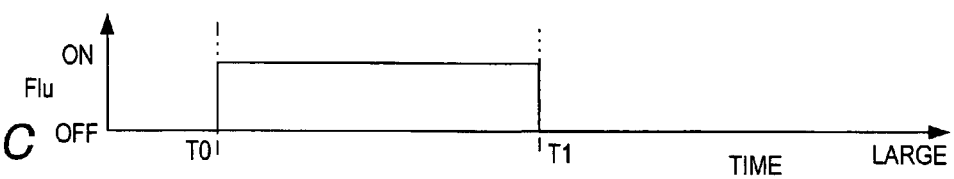
Figure 3D:
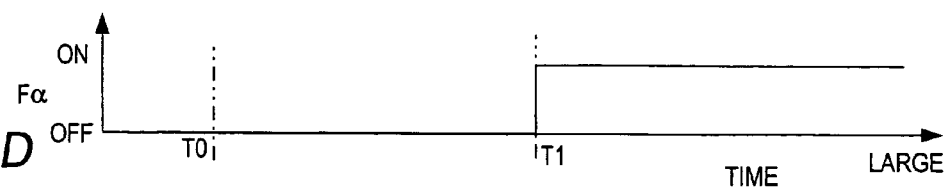
Figure 5A:
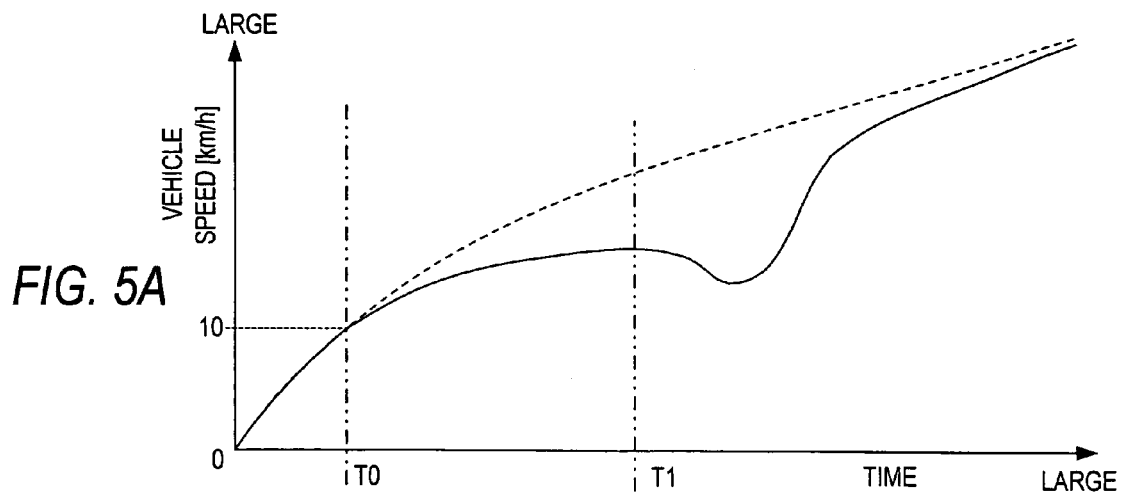
FIGS. 5A-5D are schematic views showing how control in a second embodiment is performed.
Figure 5B:
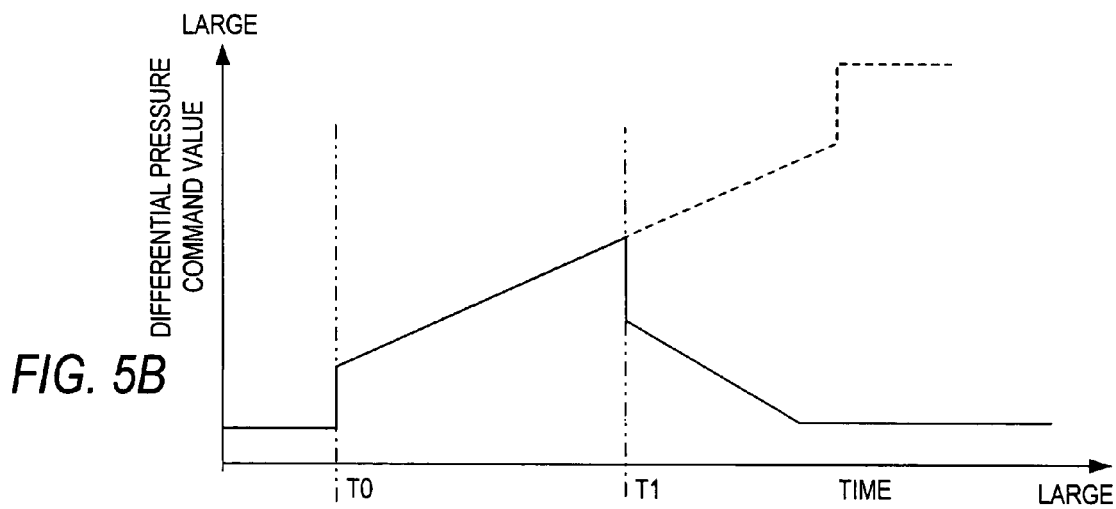
Figure 5C:
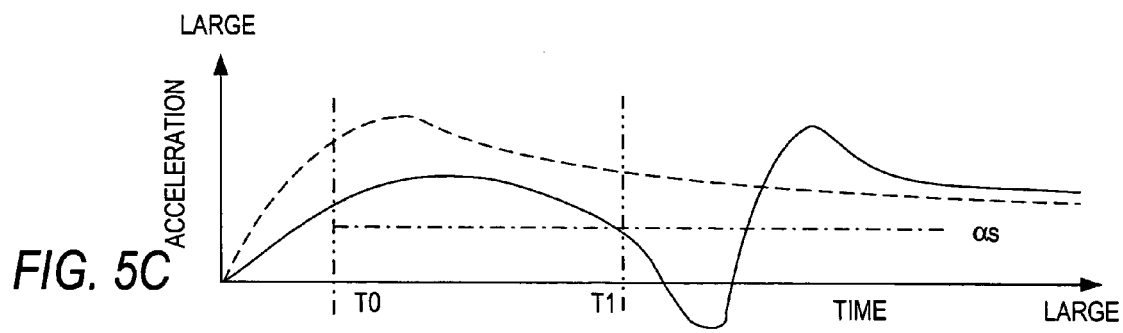
Figure 5D:
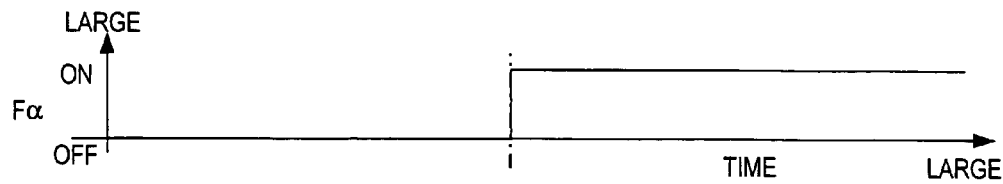

However, when the increase of the vehicle speed VSP is saturated by starting the vehicle on a steep ascending slope or the like, the smooth lock-up is disconnected before being completed, as shown by the solid lines in FIGS. 3A and 3B. In FIGS. 3A and 3B, at a time T1, the fourth monitoring of the vehicle speed VSP is conducted after the start of the smooth lock-up ON control. Since the vehicle speed VSP is less than the vehicle speed threshold Vss (4) at the time T1, the smooth lock-up ON control is discontinued, and the smooth lock-up OFF control is started instead. As a result, the differential pressure command value is gradually reduced in the predetermined pattern and the lock-up clutch 6 is completely released. Along with the disengagement of the lock-up clutch 6, the torque converter 5 is brought to the converter state, the input torque is amplified, and the engine speed Ne is raised. Thereby, even under a high load on an ascending slope or the like, the increase of the vehicle speed VSP is secured and the mobility performance of the vehicle can be maintained. Further, locking up in a state where there is not enough torque is avoided, whereby the occurrence of a muffled sound is prevented.

Figure 6:
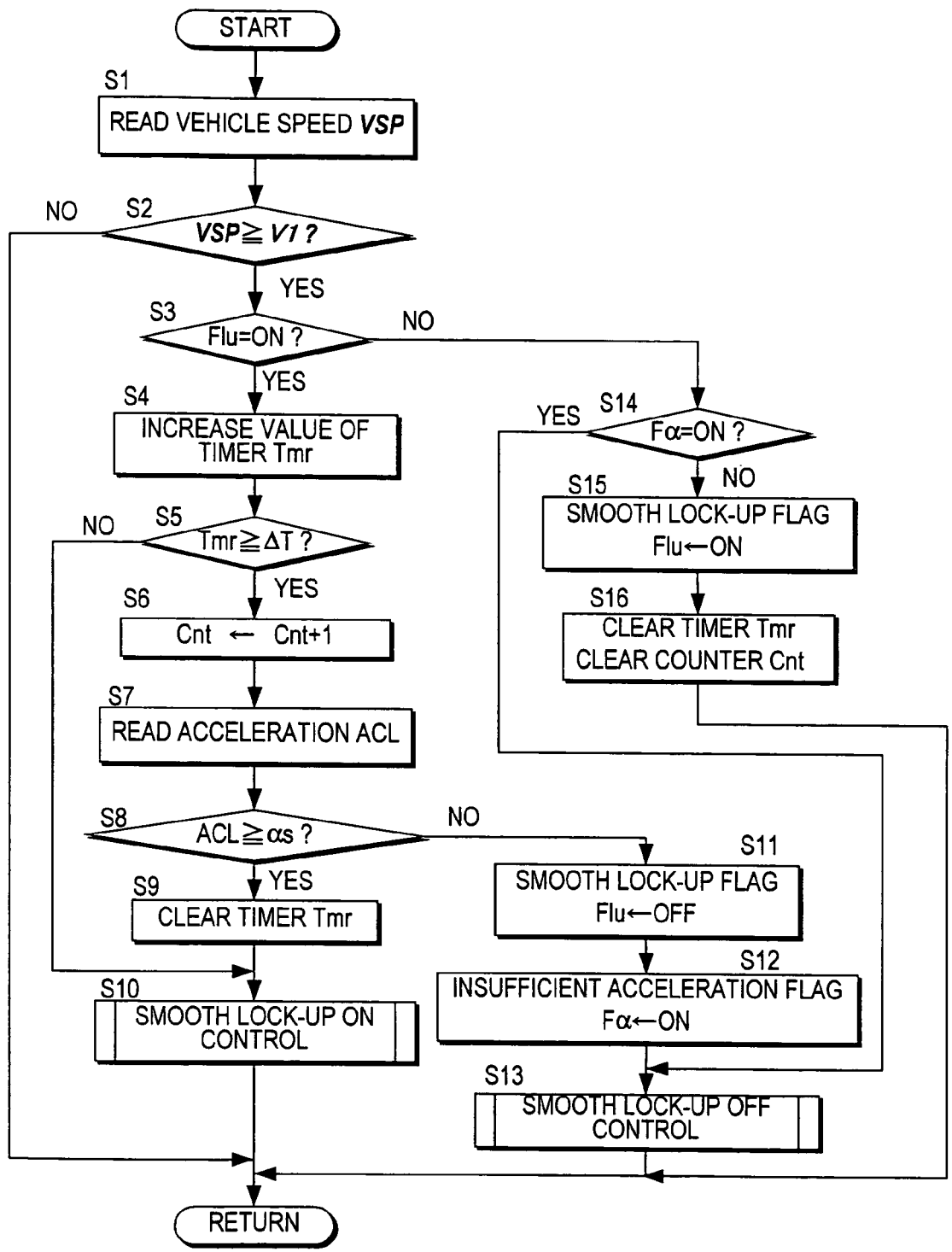
FIG. 6 is a flow chart showing a control routine conducted by the AT controller according to the second embodiment.

A second embodiment will now be described with reference to FIGS. 5A-5D and FIG. 6. In the first embodiment described above, a slowdown has been detected in the increase of the vehicle speed VSP by a result of the comparison between the vehicle speed VSP and the vehicle speed threshold Vss (Cnt) for every predetermined period of time $\Delta T$. The vehicle speed threshold Vss (Cnt) is set in accordance with the time elapsed since the start of the smooth lock-up ON control. However, as shown in FIGS. 5A-5D, when a detected acceleration of the vehicle falls below a threshold $\alpha s$ (e.g. about 0.08G) which is set in advance, the slowdown in the increase of the vehicle speed VSP is assessed, and the smooth lock-up ON control may be discontinued as in the abovementioned embodiment to start the smooth lock-up OFF control. Detection of an acceleration ACL may be performed by the AT controller calculating a time derivative of the vehicle speed VSP, or an acceleration sensor 19 may be provided to directly detect an acceleration ACL. Specifically, the vehicle speed sensor 13 or the acceleration sensor 19 functions as a sensor which detects the rise of the vehicle speed. Referring to FIG. 6, the threshold as for the acceleration ACL of the vehicle is read in Step S7, and the detected acceleration ACL may be compared to the threshold as in Step S8. The processing of the other steps is the same as the first embodiment.

Although the invention has been described above by reference to a certain embodiment of the invention, the invention is not limited to the embodiments described above. Modifications and variations of the embodiments described above will occur to those skilled in the art, in light of the above teachings. The scope of the invention is defined with reference to the following claims.

The entire contents of Japanese Patent Application P2004-106539 (filed Mar. 31, 2004) are incorporated herein by reference.

What is claimed is:

1. A lock-up clutch control device which controls a lock-up clutch provided in a torque converter which is mounted between an engine and a transmission provided in a vehicle, the lock-up clutch control device switching a state of the torque converter between a converter state and a lock-up state by controlling a differential pressure supplied to the lock-up clutch, the lock-up clutch control device comprising:
   a sensor for detecting a rise of a vehicle speed;
   a differential pressure generator which generates the differential pressure supplied to the lock-up clutch; and
   a controller programmed to:
      command the differential pressure generator to lock the lock-up clutch when the vehicle speed exceeds a predetermined low vehicle speed, after the vehicle is started;
      subsequently monitor the rise of the vehicle speed; and
      command the differential pressure generator to unlock the lock-up clutch when the monitored rise of the vehicle speed is lower than a preset value.

2. The control device as defined in claim 1, wherein the sensor for detecting the rise of the vehicle speed is a vehicle speed sensor which detects the vehicle speed, and
   wherein the controller is programmed to:
      set a vehicle speed threshold in accordance with a time elapsed since the differential pressure generator is commanded to lock the lock-up clutch;
      compare the detected vehicle speed to the vehicle speed threshold; and
      command the differential pressure generator to unlock the lock-up clutch if the vehicle speed is less than the vehicle speed threshold.

3. The control device as defined in claim 2, wherein the vehicle speed threshold increases with an increase in the time elapsed since the differential pressure generator is commanded to lock the lock-up clutch.

4. The control device as defined in claim 1, wherein the sensor for detecting the rise of the vehicle speed is an acceleration sensor which detects an acceleration of the vehicle, and
   wherein the controller is programmed to:
      compare a predetermined acceleration to a detected acceleration; and
      command the differential pressure generator to unlock the lock-up clutch if the detected acceleration is lower than the predetermined acceleration.

5. The control device as defined in claim 1, wherein the sensor for detecting the rise of the vehicle speed is a vehicle speed sensor which detects the vehicle speed, and
   wherein the controller is programmed to:
      set a vehicle speed threshold in accordance with a time elapsed since a control to lock the lock-up clutch is enabled;
      compare the detected vehicle speed to the vehicle speed threshold; and
      command the differential pressure generator to unlock the lock-up clutch if the vehicle speed is less than the vehicle speed threshold.

6. The control device as defined, in claim 5, wherein the controller is programmed to enable the control to lock the lock-up clutch by setting a flag.

7. The control device as defined in claim 5, wherein the vehicle speed threshold increases with an increase in the time elapsed since the control to lock the lock-up clutch is enabled.

8. The control device as defined in claim 1, wherein the sensor for detecting the rise of the vehicle speed is a vehicle speed sensor which detects the vehicle speed, and
   wherein the controller is programmed to:
      calculate an acceleration of the vehicle as a time derivative of the vehicle speed;
      compare a predetermined acceleration to the calculated acceleration; and
      command the differential pressure generator to unlock the lock-up clutch if the calculated acceleration is lower than the predetermined acceleration.

9. A lock-up clutch control device which controls a lock-up clutch provided in a torque converter which is mounted between an engine and a transmission provided in a vehicle, the lock-up clutch control device switching a state of the torque converter between a converter state and a lock-up state by controlling a differential pressure supplied to the lock-up clutch, the lock-up clutch control device comprising:
   detecting means for detecting a rise of a vehicle speed;
   differential pressure generating means for generating the differential pressure supplied to the lock-up clutch;
   first commanding means for commanding the differential pressure generating means to lock the lock-up clutch when the vehicle speed exceeds a predetermined low vehicle speed, after the vehicle is started;
   monitoring means for monitoring the rise of the vehicle speed after the first commanding means commands the differential pressure generating means to lock the lock-up clutch; and
   second commanding means for commanding the differential pressure generating means to unlock the lock-up clutch when the monitored rise of the vehicle speed is lower than a preset value.

10. A lock-up clutch control method for controlling a lock-up clutch provided in a torque converter which is mounted between an engine and a transmission provided in a vehicle, a state of the torque converter is switched between a converter state and a lock-up state by a control of a differential pressure supplied to the lock-up clutch; the lock-up clutch control method comprising:
   detecting a rise of a vehicle speed;
   commanding a differential pressure generator, which generates the differential pressure supplied to the lock-up clutch, to lock the lock-up clutch when the vehicle speed exceeds a predetermined low vehicle speed, after the vehicle is started;
   subsequently monitoring the rise of the vehicle speed; and
   commanding the differential pressure generator to unlock the lock-up clutch when the monitored rise of the vehicle speed is lower than a preset value.

* * * * *